Oct. 4, 1932.  S. G. BAITS  1,880,655
REAR AXLE ASSEMBLY
Filed March 18, 1931
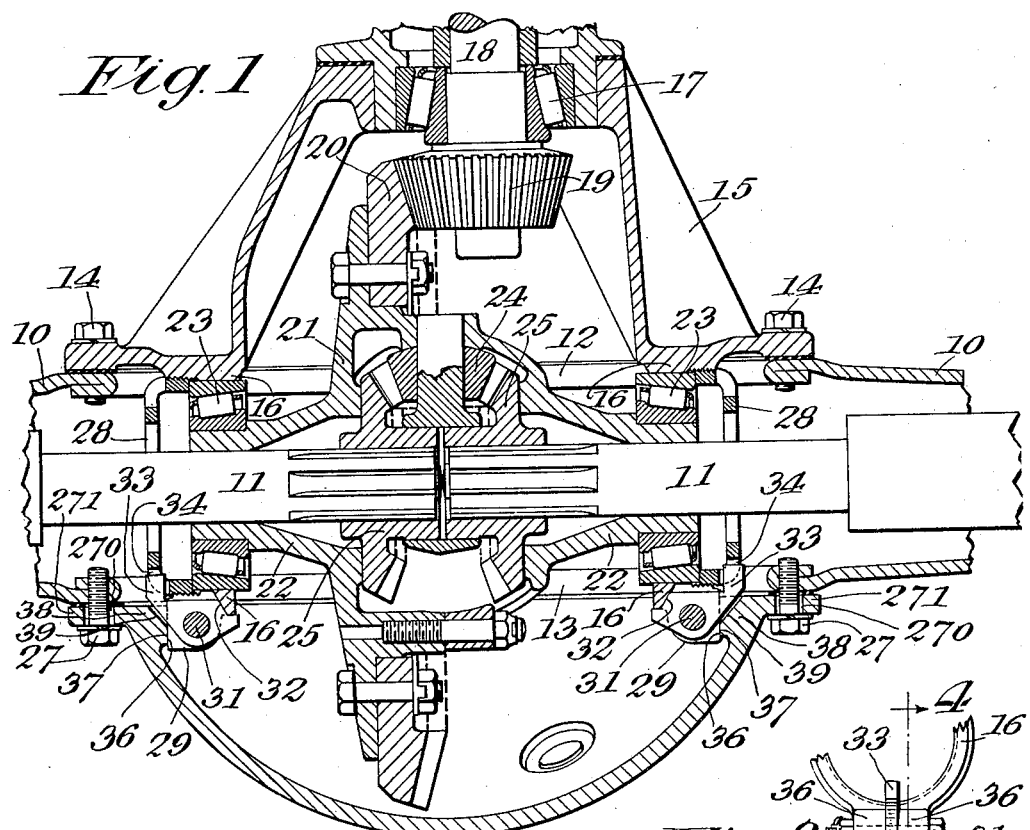
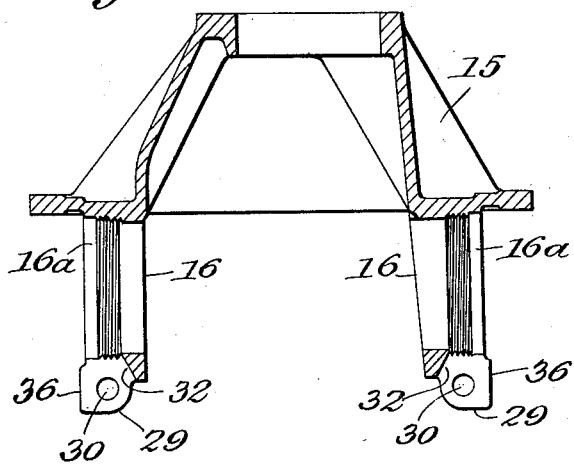
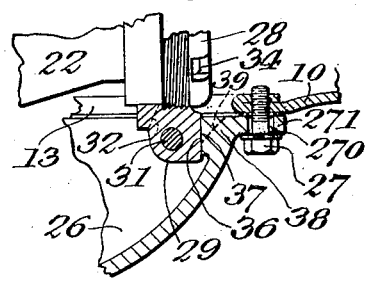
Inventor:
Stuart G. Baits,
By MacLeod, Calver, Copeland & Dike,
Attorneys Patented Oct. 4, 1932

1,880,655

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

REAR AXLE ASSEMBLY

Application filed March 18, 1931. Serial No. 523,432.

This invention relates to motor vehicle rear axle assemblies of the type comprising a rear axle housing, a differential mechanism within the housing and cooperating with the live axle sections therein, and a differential carrier seated in the housing and having spaced arms in which the differential spider is journalled. In such assemblies there is found in practice to be a tendency on the part of the arms of the differential carrier to spread, thereby disturbing the position and alinement of the differential spider bearings and the live shaft sections, and the present invention has for its general object to provide simple and effective means for overcoming this difficulty.

The more particular objects of the invention, together with means whereby the latter may be carried into effect, will best be understood from the following description of a preferred embodiment thereof illustrated in the accompanying drawing. It will be understood however that the particular construction described and shown has been chosen for purposes of exemplification merely, and that the invention, as defined by the claims hereunto appended, may be otherwise embodied without departure from the spirit and scope thereof.

In said drawing:

Fig. 1 is a horizontal sectional view of the central portion of a motor vehicle rear axle assembly including the differential mechanism.

Fig. 2 is a detail sectional view of the differential carrier, per se.

Fig. 3 is a detail fragmentary end view of one of the carrier arms.

Fig. 4 is a detail fragmentary section, taken substantially on the line 4—4, Fig. 3, of a portion of one of the carrier arms and of the differential casing cover, illustrating the cooperation of these parts.

In Fig. 1 is shown a rear axle housing 10 enclosing the live axle sections 11 and having a central enlarged portion formed with oppositely disposed front and rear openings 12 and 13. Seated in the opening 12 and secured to the surrounding portion of the housing 10, as by bolts 14, is a differential carrier 15 in the form of a yoke having rearwardly extending spaced parallel arms 16. The head of the yoke 15 carries the bearing 17 for the propeller shaft 18 having at its rear end the usual drive pinion 19 which meshes with a ring gear 20 carried by the differential spider 21. The latter is formed with oppositely disposed arms or trunnions 22 journalled in anti-friction bearings 23 in the arms 16, said spider carrying the planetary pinions 24 which mesh with the gears 25 on the ends of the live axle sections 11 which sections are axially disposed within the arms or trunnions 22. The parts of the differential mechanism are assembled in the axle housing through the opening 13 therein, which opening is normally closed by a cover 26 secured to the housing about the edge of said opening, as by cap screws 27 passing through openings 270 in a flange 271 formed on the edge of said cover.

In the embodiment of the invention herein shown, the arms 16 of the differential carrier 15 are of unitary construction and the openings 16a therein to receive the bearings 23 are outwardly flared to permit the differential spider to be laced into place through the opening 13, after which the bearings 23 are applied and held in place by retainers 28 in threaded engagement with said openings. Also in the construction shown, the free ends of the carrier arms 16 are provided with projecting lugs 29 each of which has a transverse bore 30 to receive a clamping bolt 31, and each of which is partially slotted at 32 to receive a locking key 33 mounted on the bolt 31 and having its end projecting into any one of a series of slots or castellations 34 in the corresponding retainer 28, as shown in Fig. 1. Each bolt 31 is provided with a nut 35 by tightening which the outer sides of the openings 13 may be contracted to clamp the bearings 23 and retainer 28, the latter being further locked against rotation by the key 33.

In accordance with the present invention, the lugs 29 are formed with bosses having preferably flat outer faces 36 which are accurately machined to fit correspondingly machined inner faces 37 on interior shoulders 38 formed on the cover 26. The arrangement is such that when said cover is secured in place by the cap screws 27, the shoulders 38 abut and embrace the surfaces 36 on the carrier arms 16, thereby confining said arms laterally and effectually preventing any tendency for these arms to spread and disturb the position and alinement of the differential bearings. In order to facilitate assembly, the openings 270 are preferably of sufficient size to provide clearance around the cap screws 27. The shoulders 38 may, if necessary, be slotted opposite the slots 32, as shown at 39. to receive the keys 33.

It will be seen that the invention, while effectually accomplishing the desired result and correcting a troublesome difficulty in assemblies of this type, is of extreme simple character, not adding materially to the cost of production or to the labor of assembling since the mere bolting of the differential cover 26 in place serves to bring the parts into the necessary cooperative relation to effect their intended function.

What I claim is:

1. A rear axle assembly for motor vehicles comprising an axle housing having an opening therein, a differential carrier seated in said housing and having a pair of separated arms, a differential spider journalled in said arms, and a cover for said opening having means to engage and rigidly embrace the outer free ends of said arms and thereby hold the latter against spreading.

2. A rear axle assembly for motor vehicles comprising an axle housing having an opening therein, a differential carrier seated in said housing and having a pair of separated arms, a differential spider journalled in said arms, and a cover for said opening, said cover having interior shoulders adapted to engage and rigidly embrace the outer free ends of said arms and thereby hold the latter against spreading.

3. A rear axle assembly for motor vehicles comprising an axle housing having an opening therein, a cover for said opening, a differential carrier seated in said housing and having a pair of separated arms, and a differential spider journalled in said arms, said arms having at their free ends projecting lugs with machined outer faces, and said cover having interior shoulders with correspondingly machined inner outer faces abutting and fitting the faces on said lugs to hold said arms against spreading.

In testimony whereof I affix my signature.

STUART G. BAITS.